Dec. 3, 1957    C. C. VAN ARSDALE, JR., ET AL    2,815,172
SLIDE RULE
Filed Nov. 9, 1956
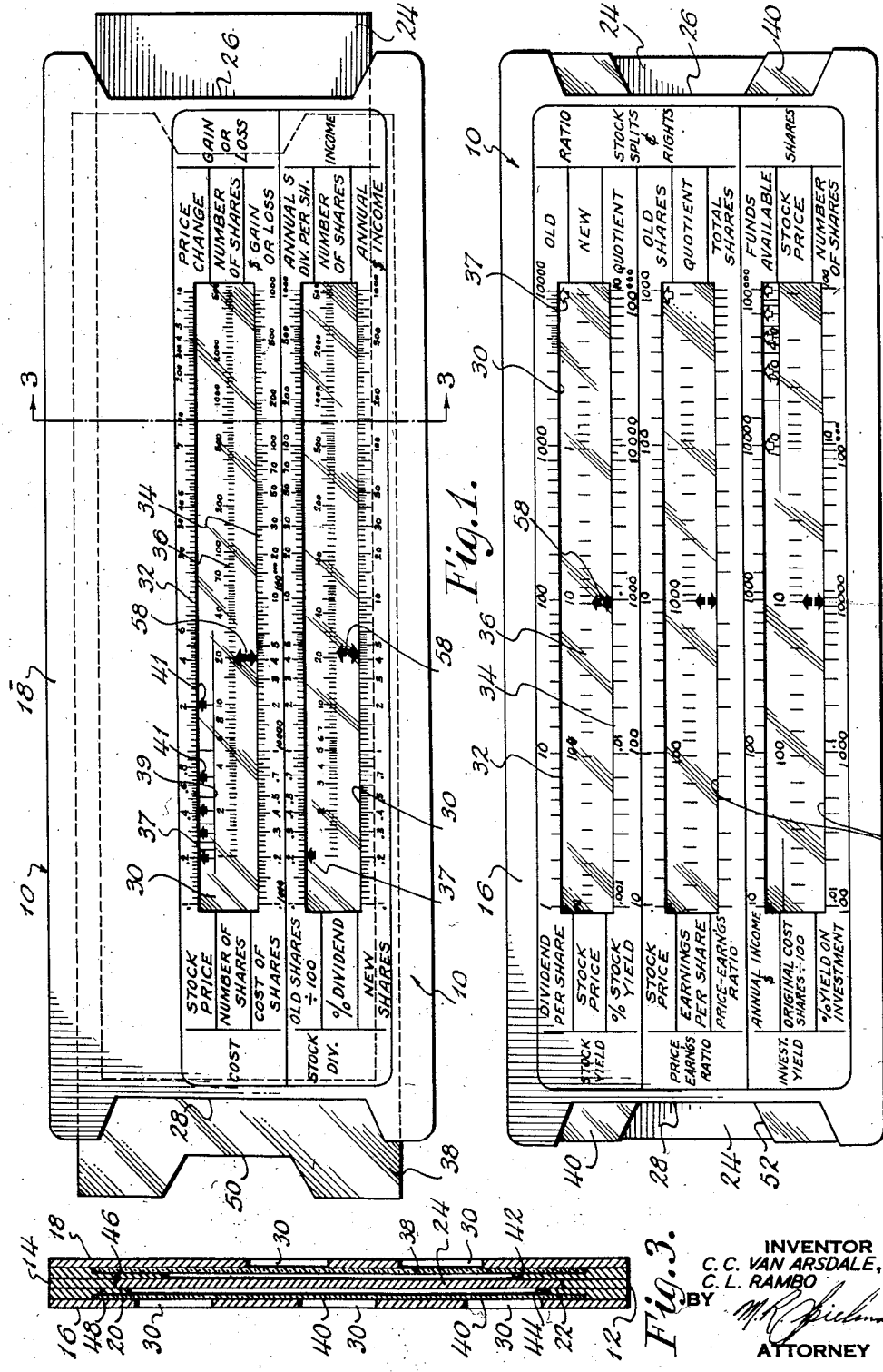
INVENTOR
C. C. VAN ARSDALE, JR.
C. L. RAMBO
BY
ATTORNEY

United States Patent Office 2,815,172
Patented Dec. 3, 1957

2,815,172

SLIDE RULE

Clarence C. Van Arsdale, Jr., Culver City, and Charles Lucas Rambo, Santa Monica, Calif.

Application November 9, 1956, Serial No. 621,316

4 Claims. (Cl. 235—70)

This invention relates to calculators, and more particularly, is concerned with a manually operated slide rule calculator for making a plurality of computations of a related nature.

Slide rules for making a large variety of computations are well known in the art. The most common type of slide rule involves a central slide between two guide members with registering scales on the slide and the guide members. A cross-hair is provided on an external bridge-like member which guides on the outer edges of the guide members. This external bridge member with its cross-hair is a source of error in the slide rule because the length of the guide portions of the bridge are short compared to the distance between the guide portions of the bridge. Thus, wear of the guide portions or slight misalignment of the cross-hair in relation to the guide portions of the bridge member result in magnified tilting and misalignment of the cross-hair. Furthermore, because the bridge member guides on the outer edges of the slide rule guiding members, and therefore is external to the rest of the slide rule, it is more vulnerable to damage and blows that put the cross-hair out of alignment.

Slide rules generally provide a pair of registering scales that are adjacent to each other but are relatively movable with respect to each other. Calculations generally involve positioning a scale indication on one scale opposite a selected scale indication on the other scale. Where the scales are quite fine and particularly where the quantity being used in the calculations must be interpolated between scale indications, this procedural step is difficult to make rapidly yet accurately.

Furthermore, in the usual linear type slide rule where a number of different computations are made, in order to use a single slide with guide members on either side of the slide, a number of closely spaced scales are printed on the slide and on both guide members on either side of the slide. The result is a confusion of scales which must be kept separate and identified correctly by the operator in making calculations. The close mingling of the scales increases the chance for error and makes the operation of the slide rule more confusing and difficult to master.

It is the general object of this invention to avoid and overcome the foregoing and other difficulties in and objections to the prior art practices by the provision of an improved slide rule type calculator that is easier to master and to operate, more versatile, simpler in operation, yet more accurate and durable.

Another object of this invention is to provide a slide rule in which the equivalent of the conventional cross-hair is on an internal slide protected by the main frame of the slide rule.

Another object of this invention is the provision of a slide rule in which numbers are set on or read off a scale by an arrow-shaped indicator, the scales being separated from each other to avoid placing a scale indication on one scale directly opposite a scale indication on an adjacent scale.

Another object of this invention is to provide a slide rule in which a multiplicity of calculations can be carried out using the same single frame, slide, and cross-hair but wherein the scales for the different calculations are separated from each other to avoid confusion between the scales provided for other calculation and the scale selected for the desired calculation.

These and other objects of the invention which will become apparent as the description proceeds are achieved by a slide rule comprising a frame including front and back scale surfaces having a plurality of longitudinal parallel openings therein. An opaque slide member positioned for longitudinal movement between the front and back surfaces of the frame has a plurality of scales thereon entirely visible through corresponding openings in the front and back surfaces of the frame member. The openings are provided with scales along each longitudinal edge. Transparent slides are positioned for longitudinal movement between the opaque slide and the front and back surfaces respectively. The transparent slides are provided with a plurality of double arrow index markers, each marker being in registration at one end with a scale on the opaque slide and at the other end with a scale on one edge of the associated opening. Each scale on the opaque slide is provided at each end thereof with the scale on the other edge of the associated opening.

For a better understanding of the invention, reference should be had to the accompanying drawing, wherein:

Fig. 1 is a plan view of one side of a preferred embodiment of the present invention;

Fig. 2 is a plan view of the reverse side of the slide rule of Fig. 1; and

Fig. 3 is a sectional view taken on the line 3—3 of Fig. 1.

In reference to the drawing, the numeral 10 indicates generally the frame member of the slide rule of the present invention. The frame member 10 includes a pair of spaced longitudinal guide portions 12 and 14 held in fixed parallel relationship by thin front and back facing members or portions 16 and 18. The frame member is preferably constructed of laminated sheets of plastic or paper material to give it added stiffness and strength, but may be molded in a single piece if desired.

The guide portions 12 and 14 have longitudinal grooves 20 and 22, respectively, which slidably engage the edges of an opaque slide member 24, also made of paper or plastic. The slide member is positioned by the grooves 20 and 22 half way between the front and back portions 16 and 18 of the frame marker 10, and extends the full length of the frame member. The front and back portions 16 and 18 are notched or cut away at the ends, as indicated at 26 and 28, to permit the slide member to be grasped in the fingers from either end for positioning the slide member 24.

A plurality of longitudinal openings 30 (or transparent areas) are provided in the front and back portions 16 and 18. The number of such openings is shown by way of example to include two in the front and three in the back in the illustrated embodiment. However, the number of such openings may be varied depending on the number and types of computations to be performed by the slide rule, as will hereinafter be explained in more detail. The two longitudinal edges of each opening are provided with graduated scales, as indicated at 32 and 34, which may be printed, embossed, engraved, or otherwise formed on the front and back surfaces 16 and 18 of the slide rule frame member 10.

Similar graduated scales as indicated at 36 are provided on each side of thhe opaque slide member 24 opposite each of the openings 30 in the front and back portions 16 and 18. The scales on the slide member 24 are positioned half way between the edges of the associated openings 30 so that the scales 32 and 34 on the frame member are spaced from the scale 36 in each instance to avoid confusion of numbers and scale indications and simplify operation of the slide rule in making computations.

Each end of the respective scales 36 on the opaque slide is provided with an index marker, as indicated at 37, the index markers preferably being in the form of an arrow pointing upwardly toward the scale 32 along the upper edge of the associated opening 30. Not only a single index marker may be provided at the ends of the scaler 36, but an auxiliary scale 39 including a plurality of spaced index markers, as indicated at 41, may be provided for modified computations, as hereinafter more fully described.

Slidably positioned on either side of the opaque slide 24 are a pair of transparent slides 38 and 40. The transparent slides 38 and 40 are guided along their longitudinal edges by suitable grooves in the guide portions 12 and 14 formed by spaced laminations 42, 44, 46 and 48, and the front and back facing portions 16 and 18. The spacer laminations, which form part of the guide portions 12 and 14 of the frame 10, separate the opaque slide 24 from the transparent slides 38 and 40 so that movement of one slide will not disturb the other slides through any frictional contact therebetween. The transparent slides 38 and 40 are made wider than the opaque slide 24 so they can be gripped by the edges to position them without disturbing the opaque slide 24. The ends of the transparent slides 38 and 40 are notched out as indicated at 50 and 52. This permits the opaque slide to be easily manipulated even though the transparent slides are made the same length as the opaque slide 24 and the frame member 10.

It will be appreciated that alternatively the spacers 42, 44, 46 and 48 may be made of two transparent sheets of material extending across the entire width of the slide rule between the opaque slide 24 and the transparent slides 38 and 40.

The transparent slides 38 and 40 are provided with a plurality of index markers, as indicated at 58, each of which is visible through an associated opening 30 in the front and back portions 16 and 18 of the frame member 10. Each of the index markers 58 on the transparent slides 38 and 40 is preferably in the form of an opaque double arrow. One end of the double arrow points to graduations of the scale 36 on the opaque slide 24 and the other end of the double arrow points in the opposite direction to the scale 34 along the lower edge of the associated opening 30. While a double-arrow index marker is shown in the preferred form of the invention, a single cross-hair type index marker may be employed. The double-arrow marker has the advantage that it points out clearly the manner in which the slide rule is to be read. Separation of the scales 34 and 36 permits use of the double-arrow index without covering up any of the numbers or scale graduations.

Operation of the slide rule in general requires the operator to position the opaque slide 24 to set the arrow index markers 37 thereon opposite a first selected quantity identified by number or interpolated on the upper scale 32. The transparent slide is then adjusted to position the upper end of the double arrow of the index marker 58 opposite a second selected quantity on the scale 36 of the opaque slide 24. The answer is then read off the lower scale 34 opposite the lower end of the double-arrow of the index marker 58. For instance, to achieve straight multiplication or division, all the scales are made logarithmic, as in a conventional slide rule. In the case of division, the scale on the opaque slide may be reversed so as to increase in number from right to left, instead of from left to right in the manner of the other scales. The division operation is then carried as set forth above.

In the slide rule illustrated in the drawings, the scales are arranged to provide a number of stock and security computations. With the upper scales as shown in Fig. 1, cost of stock shares is calculated knowing the price per share and number of shares. For example, with the slide rule adjusted as shown in the drawing, if the price per share is .20, the arrow on the right is set opposite .2 on the upper scale 32. The upper end of the arrow on the transparent slide is then set at 20, the number of shares, on the scale 36. The answer is then read on the lower scale 34 opposite the lower end of the double arrow. The answer given is roughly $4.10, the .10 being a correction factor built into the slide rule by shifting the index markers 37 on the ends of the scale 36 the proper amount to allow for normal broker's fees and taxes.

It should be noted that in addition to the arrow 37 at the left end of opaque scales 36, a scale having a series of arrows may be provided on the opaque slide, as indicated at 41. The additional index markers or arrows 41 provide an additional multiplication step, as when three numbers are to be multiplied. In the example of the cost of shares, the additional arrows provide a measure of calculating the effect of margin buying, the index marker 37 being used only for 100% margin transactions.

The same scales as described above in calculating cost of shares may be used to calculate gain or loss, knowing price change per share and number of shares. The scales are arranged over a range of values to permit normal calculations without regard to decimal points, the answer being readable directly to the correct number of places. For this reason a second set of numbers are provided opposite the divisions on the lower scales 34. These numbers are used when the arrow markers 37 on the right end of the scales 36 (see Fig. 2) are used. The second set of numbers and the right-hand arrows are preferably of a different color to identify them and distinguish them from the left-hand arrows and numbers used with the left-hand arrows.

Other calculations provided by the slide rule as illustrated in the drawing include stock dividend, knowing the number of old shares and percent dividend, and income knowing the dividend per share and the number of shares. It will be noted that both sets of scales on the front of the slide rule, as shown in Fig. 1, involve a multiplication type of calculation.

On the reverse side of the slide are shown six other computations: stock yield, price-earnings ratio, investment yield, stock splits and rights, and number of shares purchasable. These calculations are made on three separate sets of scales and involve a division type of calculation. Thus, the scales on the opaque slide are reversed from the scales on the face of the slide rule along the edges of the openings 30.

From the above description, it will be appreciated that the various objects of the invention have been achieved by providing a slide rule having a number of features making it easier and simpler to use and operate. All calculations are made by placing an arrow opposite a number and the answer is read off by a number opposite an arrow. Thus, there is no positioning of one number over another on separate scales. The scales are widely separated to prevent confusion or erroneous readings. A large number of computations can be carried out using a common slide, frame, and cross-hair in the manner of known slide rules, yet the scales appropriate to each computation are grouped separately from the other scales. The cross-hair of the conventional slide rule is replaced by the transparent slide with the double-arrows thereon. Since the transparent slides are guided along edges having the full length of the slide rule, there is less chance for misalignment of the cross-hair. The transparent slides are more protected and therefore less vulnerable to damage.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A multiple scale slide rule comprising a longitudinal frame member including a pair of spaced parallel thin front and back portions and longitudinally extending spacer portions positioned between the front and back portions of the frame member along the longitudinal edges thereof, the spacer portions having three longitudinally extending grooves therein, three slide members being slidably posiitoned in respective grooves in the spacer portions, whereby the slide members are independently movable in the space between the parallel front and back portions of the frame member, the middle slide member being opaque and the two outer slide members being transparent, the front and back portions having a plurality of longitudinally extending openings therein, the front and back portions having scale indications along the longitudinal edges of each of the openings, the opaque slide having a scale indication in the region thereof opposite said openings, whereby the scales in the opaque slide are visible through the openings in the front and back portions of the frame member and through the respective transparent slides, the opaque slide having at least one marker thereon associated with each scale and positioned in registration with one of the scales along the edge of the corresponding opening in the frame member, whereby the opaque slide may be positioned to register with a known quantity selected on the associated scale along an edge of an opening in the frame member, and the transparent slides having markers thereon, at least one of which is visible through each of the openings and positioned in registration with the associated scale on the opaque slide and the remaining scale on the edge of the associated opening in the frame member.

2. A slide rule calculator comprising a frame member including a pair of spaced longitudinal guides, an opaque longitudinal slide member supported along parallel edges thereof by the longitudinal guides of the frame member for relative movement between the opaque slide member and the frame member, and a transparent slide member supported along parallel edges thereof by the longitudinal guides of the frame member for relative movement between the transparent slide member and the frame member, the transparent slide over-lying the opaque slide member and being wider than the opaque slide, the guides having spacer portions projecting between the opaque slide member and the transparent slide member to prevent direct contact between the two slide members, whereby they may be readily positioned independently of each other, the frame member including a facing member extending between the guides and overlying the transparent slide, the slide members projecting at both ends thereof beyond the edges of the facing member extending between the guides, the facing member having a plurality of longitudinal openings, each opening defining a pair of parallel edges in the facing member, the facing member having graduated scale indications along each of said edges, the opaque slide member having graduated scale indications positioned in the region opposite each opening in the facing member, the scales on the opaque scale slide member being spaced from the edges of the openings and provided with markers at either end thereof in registration with the scale indications along one of said edges of the associated openings, and the transparent slide member having a marker thereon positioned in the space between the other of said edges of the associated openings, each of the markers on the transparent slide member being in registration at one end thereof with the scale indications on the opaque slide member and in registration at the other end thereof with the scale indications on said other of the edges of the associated opening in the facing member.

3. A slide rule calculator comprising a frame member including a pair of spaced longitudinal guides, an opaque longitudinal slide member supported along parallel edges thereof by the longitudinal guides of the frame member, for relative movement between the opaque slide member and the frame member, and a transparent slide member supported along parallel edges thereof by the longitudinal guides of the frame member for relative movement between the transparent slide member and the frame member, the transparent slide overlying the opaque slide member, the guides having spacer portions projecting between the opaque slide member and the transparent slide member to prevent direct contact between the two slide members, whereby they may be readily positioned independently of each other, the frame member including a facing member extending between the guides and overlying the transparent slide, the slide member projecting at both ends thereof beyond the edges of the facing member extending between the guides, the facing member having at least one longitudinal opening, each opening defining a pair of parallel edges in the facing member, the facing member having graduated scale indications along each of said edges, the opaque slide member having graduated scale indications positioned in the region opposite each opening in the facing member, the scales on the opaque scale slide member being provided with markers at either end thereof in registration with the scale indications along one of said edges of the associated openings, and the transparent slide member having at least one marker thereon, each of the markers on the transparent slide member being in registration at one end thereof with the scale indications on the opaque slide member and in registration at the other end thereof with the scale indications on said other of the associated openings in the facing member.

4. A slide rule calculator comprising a frame member including a pair of spaced longitudinal guides, an opaque longitudinal slide member supported along parallel edges thereof by the longitudinal guides of the frame member for relative movement between the opaque slide member and the frame member, and a transparent slide member supported along parallel edges thereof by the longitudinal guides of the frame member for relative movement between the transparent slide member and the frame member, the transparent slide overlying the opaque slide member, the frame member including a facing member extending between the guides and overlying the transparent slide, the slide members projecting at both ends thereof beyond the edges of the facing member extending between the guides, the facing member having at least one longitudinal opening, each opening defining a pair of parallel edges in the facing member, the facing member having graduated scale indications along each of said edges, the opaque slide member having graduated scale indications positioned in the region opposite each opening in the facing member, the scales on the opaque scale slide member being provided with markers at either end thereof in registration with the scale indications along one of said edges of the associated openings, and the transparent slide member having a marker thereon in registration at one end thereof with the scale indications on the opaque slide member and in registration at the other end thereof with the scale indications on said other of the edges of the associated opening in the facing member.

No references cited.